(12) United States Patent
Wei et al.

(10) Patent No.: US 8,209,956 B2
(45) Date of Patent: Jul. 3, 2012

(54) SCR EMISSIONS CONTROL SYSTEM

(75) Inventors: Zhiyong Wei, Chicago, IL (US); Cho Ying Liang, Henderson, NV (US)

(73) Assignee: Caterpillar Inc., Peoria, IL (US)

(*) Notice: Subject to any disclaimer, the term of this patent is extended or adjusted under 35 U.S.C. 154(b) by 1189 days.

(21) Appl. No.: 11/882,218

(22) Filed: Jul. 31, 2007

(65) Prior Publication Data

US 2009/0031710 A1 Feb. 5, 2009

(51) Int. Cl.
*F01N 3/00* (2006.01)

(52) U.S. Cl. ............... 60/286; 60/295; 60/297; 60/301

(58) Field of Classification Search .............. 60/286, 60/285, 295, 301, 274, 297, 303
See application file for complete search history.

(56) References Cited

U.S. PATENT DOCUMENTS

| | | | |
|---|---|---|---|
| 4,314,345 A | 2/1982 | Shiraishi et al. | |
| 5,833,932 A | 11/1998 | Schmelz | |
| 6,125,629 A | 10/2000 | Patchett | |
| 6,415,602 B1 | 7/2002 | Patchett et al. | |
| 6,446,430 B1 | 9/2002 | Roth et al. | |
| 6,536,210 B1 | 3/2003 | Komoriya et al. | |
| 6,662,553 B2* | 12/2003 | Patchett et al. | 60/286 |
| 6,681,565 B2 | 1/2004 | Russell | |
| 6,732,507 B1 | 5/2004 | Stanglmaier et al. | |
| 6,823,660 B2 | 11/2004 | Minami | |
| 6,826,906 B2 | 12/2004 | Kakwani et al. | |
| 6,871,489 B2 | 3/2005 | Tumati et al. | |
| 6,871,490 B2 | 3/2005 | Liang et al. | |
| 6,882,929 B2 | 4/2005 | Liang et al. | |
| 6,928,806 B2 | 8/2005 | Tennison et al. | |
| 6,996,975 B2 | 2/2006 | Radhamohan et al. | |
| 7,005,116 B2 | 2/2006 | Schäfer-Sindlinger et al. | |
| 7,055,313 B2 | 6/2006 | Russell | |
| 7,065,958 B2 | 6/2006 | Funk et al. | |
| 7,150,145 B2 | 12/2006 | Patchett et al. | |
| 7,155,331 B1 | 12/2006 | Zhang et al. | |
| 7,168,947 B2 | 1/2007 | Zamansky et al. | |
| 7,200,990 B2 | 4/2007 | Gabrielsson et al. | |
| 7,546,728 B2* | 6/2009 | Ripper et al. | 60/286 |
| 2006/0042234 A1 | 3/2006 | Song et al. | |

(Continued)

FOREIGN PATENT DOCUMENTS

WO WO 2006/021748 A1 3/2006

OTHER PUBLICATIONS

Koebel M. et al: "NOx Reduction in the Exhaust of Mobile Heavy-Duty Diesel Engines by Urea-SCR" of Jul. 1, 2004; pp. 43-48.

(Continued)

*Primary Examiner* — Binh Q Tran

(74) *Attorney, Agent, or Firm* — Finnegan, Henderson, Farabow, Garrett & Dunner LLP

(57) ABSTRACT

An emissions control system is disclosed. The emissions control system may have an SCR device that receives a flow of exhaust. The emissions control system may also have an injector that introduces a reduction agent into the flow of exhaust at or upstream of a catalyst within the SCR device. The emissions control system may have a controller in communication with the injector, the controller being configured to calculate a first amount of the reduction agent by using an approximation that at least one of a plurality of SCR reactions must be completed before the remaining SCR reactions commence. The controller may also be configured to adjust the injector according to at least the first amount.

16 Claims, 2 Drawing Sheets

U.S. PATENT DOCUMENTS

| | | |
|---|---|---|
| 2006/0045801 A1 | 3/2006 | Boyden et al. |
| 2006/0047366 A1 | 3/2006 | Boyden et al. |
| 2006/0086080 A1 | 4/2006 | Katogi et al. |
| 2006/0196285 A1 | 9/2006 | Steen et al. |
| 2007/0042495 A1 | 2/2007 | Pavlova-MacKinnon et al. |
| 2009/0049827 A1 | 2/2009 | Wei et al. |
| 2009/0049828 A1 | 2/2009 | Wei et al. |

OTHER PUBLICATIONS

M. Shost et al: "Monitoring, Feedback and Control of Urea SCR Dosing Systems for NOx Reduction: Utilizing and Embedded Model and Ammonia Sensing" SAE Tech Papers Apr. 17, 2008.

Ciardelli et al: "NH3 SCR of Nox for diesel exhausts after treatment role of NO2 in catalytic mechanism, unsteady kinetics and monolith converter modelling" Chemical Engineering Science, Oxford, GB Nov. 16, 2006.

Schär et al., "Mean-Value Model of the SCR System of a Mobile Application," IFAC, 15th Triennial World Congress, Barcelona, Spain, 2002.

U.S. Appl. No. 11/892,132, filed Aug. 20, 2007, "Control of SCR System Having a Filtering Device," pp. 1-16, Figs. 1-4.

Schär et al., "Control of a Urea SCR Catalytic Converter System for a Mobile Heavy Duty Diesel Engine," SAE International, 2003-01-0776, Mar. 3-6, 2003.

Schär et al., "Control-Oriented Model of an SCR Catalytic Converter System," SAE International, 2004-01-0153, Mar. 8-11, 2004.

Chi et al., "Modeling and Control of a Urea-SCR Aftertreatment System," SAE International, 2005-01-0966, Apr. 11-14, 2005.

Willems et al., "Is Closed-Loop SCR Control Required to Meet Future Emission Targets?" SAE International, 2007-01-1574, Apr. 16-19, 2007.

\* cited by examiner

SCR EMISSIONS CONTROL SYSTEM

TECHNICAL FIELD

The present disclosure relates generally to a controller for an SCR process, and more particularly, to a controller that calculates an amount of injected reduction agent.

BACKGROUND

Engine exhaust emissions are becoming increasingly important for engine manufacturers. Governments and regulatory agencies are enforcing ever more stringent emissions standards for many types of on-highway and off-highway vehicles. The amount of pollutants in an exhaust flow emitted from the vehicle's engine must be regulated depending on the type, size, and/or class of engine. Manufacturers must develop new technologies to meet these standards while providing high-performance, cost-effective equipment to consumers.

One method implemented by engine manufacturers to comply with the regulation of exhaust flow pollutants is the use of a selective catalytic reduction ("SCR") catalyst to clean nitrogen oxides ("NOx") from the engine exhaust flow. An SCR system works by releasing a reductant, such as ammonia ("$NH_3$"), into the engine exhaust flow in the presence of a catalyst. The $NH_3$ may be stored on the surface coating of the catalyst where it reacts with the NOx in the exhaust flow to create environmentally friendly products, such as nitrogen gas ("$N_2$") and water ("$H_2O$"). The chemical reactions of the SCR process can be represented by:

$$NH_3(g) \leftrightarrow NH_3(ads) \quad (1)$$

$$4NH_3(ads)+4NO+O_2 \rightarrow 4N_2+6H_2O \quad (2)$$

$$4NH_3(ads)+2NO+2NO_2 \rightarrow 4N_2+6H_2O \quad (3)$$

$$8NH_3(ads)+6NO_2 \rightarrow 7N_2+12H_2O \quad (4)$$

$$4NH_3(ads)+3O_2 \rightarrow 2N_2+6H_2O \quad (5)$$

Reaction (1) describes the ammonia adsorption/desorption from the catalyst, Reactions (2)-(4) are "DeNOx" reactions that describe the reaction between the reductant and the NOx in the presence of the catalyst, and Reaction (5) describes the oxidation of the ammonia.

It is generally desired to maximize the amount of NOx in the exhaust flow converted to $H_2O$ and $N_2$. To achieve this, the amount of $NH_3$ stored on the catalyst's surface may be increased. However, $NH_3$ may also be desorbed from the catalyst and carried by the exhaust flow downstream of the catalyst to a location where the $NH_3$ is released into the atmosphere (i.e., slip). $NH_3$ slip is undesirable because the unreacted $NH_3$ is released into the atmosphere and wasted. The $NH_3$ desorption rate is strongly dependent on the catalyst's temperature. As the temperature of the catalyst increases, the desorption rate of $NH_3$ from the catalyst's surface increases exponentially.

Unlike industrial or stationary SCR applications where engines or turbines generally operate at steady state conditions, mobile SCR systems used for on-highway trucks and off-road machines are subject to transient engine speeds and loads. During low load and low temperature periods of transient cycles, a large amount of $NH_3$ may be stored on the surface of the catalyst. As the engine load increases, the exhaust gas temperature increases, and the flow of hot exhaust gas quickly heats the SCR catalyst, thus causing the stored $NH_3$ to desorb. This desorbed $NH_3$ may slip into the exhaust flow and be expelled into the atmosphere.

Model-based control has been used as one method of overcoming $NH_3$ slip, while still attempting to maintain a good NOx conversion. A model-based controller uses an internal model to calculate the proper amount of reductant required to effectively react with and reduce the NOx, but not cause slip. However, solving the differential equations that describe the SCR process, which includes Reactions (1)-(5), may be computationally expensive and difficult to implement in real-time.

One method of describing Reactions (1)-(5) in order to control an SCR process is shown in SAE paper 2004-01-0153, "Control-Oriented Model of an SCR Catalytic Converter System" (the '0153 paper) by C. M. Schar et al. Specifically, the '0153 paper discloses a control oriented SCR model that uses an Eiley-Rideal mechanism to describe the SCR process.

$$4NH_3(ads)+4NO_x+O_2 \rightarrow 4N_2+6H_2O \quad (6)$$

The '0153 paper thus limits the number of reactions that must be solved by lumping the nitrogen oxide ("NO") and nitrogen dioxide ("$NO_2$") terms into a single NOx term. This simplified reaction is then used to design a model based control for an SCR device.

Although the '0153 paper may outline a method of simplifying the SCR calculations by combining Reactions (2)-(4) into a single fictional reaction, the results produced by the fictional reaction may be suboptimal. For example, the '0153 method may only account for a single global DeNOx reaction that is unable to differentiate between the NO and $NO_2$ components, which may be undesirable in some cases. The assumption that the NO and $NO_2$ may be lumped into a single term may only be realistic when there is no diesel oxidation catalyst or catalyzed soot filter upstream of the SCR. Due to differences in reaction rates and stoichiometric ratios between the three DeNOx reactions, using a single fictional reaction may create a need for extensive model calibration for every engine and aftertreatment configuration.

The present disclosure is directed at overcoming one or more of the problems set forth above.

SUMMARY OF THE DISCLOSURE

In one aspect, the present disclosure is directed to an emissions control system. The emissions control system may include an SCR device that receives a flow of exhaust. The emissions control system may also include an injector that introduces a reduction agent into the flow of exhaust at or upstream of a catalyst within the SCR device. The emissions control system may further include a controller in communication with the injector, the controller being configured to calculate a first amount of the reduction agent by using an approximation that at least one of a plurality of SCR reactions must be completed before the remaining SCR reactions commence. The controller may also be configured to adjust the injector according to at least the first amount.

In another aspect, the present disclosure is directed to a method of controlling an SCR process. The method may include creating a flow of exhaust and communicating the flow of exhaust to a catalyst. The method may also include calculating a first amount of a reduction agent for injection into the flow of exhaust, wherein calculating a first amount is achieved by approximating that at least one of a plurality of SCR reactions must be completed before the remaining SCR reactions commence. The method may further include adjusting an amount of the reduction agent currently being injected into the flow of exhaust at or upstream of the catalyst according to at least the first amount of the reduction agent.

DETAILED DESCRIPTION

Figure 1:
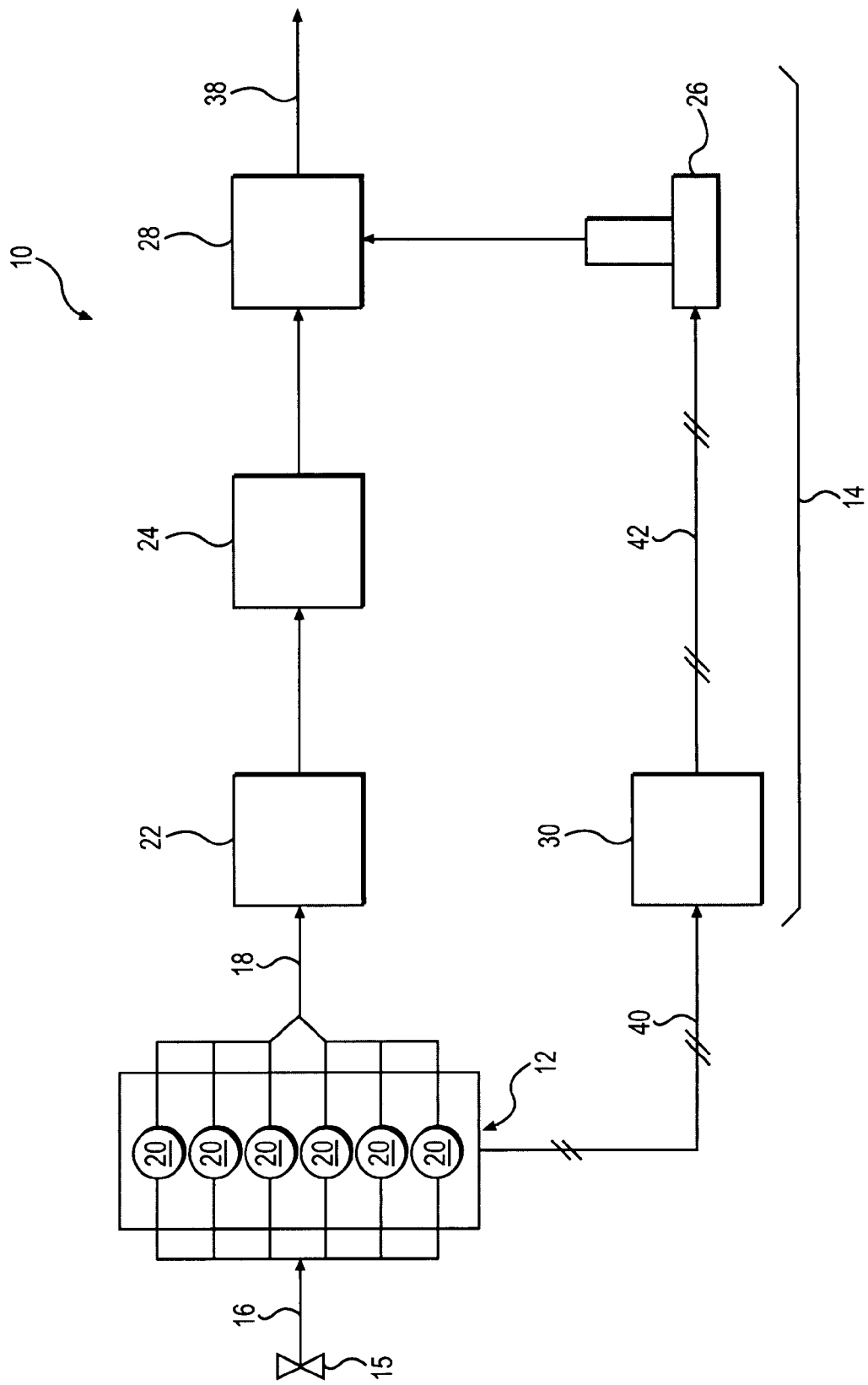
FIG. 1 is a diagrammatic illustration of an exemplary disclosed fluid system.

FIG. 1 illustrates a diagrammatic representation of a fluid system 10, including a power source 12 and an emissions control system 14. Power source 12 may embody a combustion engine, such as, for example, a diesel engine, a gasoline engine, a gaseous fuel-powered engine (e.g., a natural gas engine), or any other type of combustion engine known to one skilled in the art. Power source 12 may have a plurality of combustion chambers 20 that convert potential chemical energy (usually in the form of a combustible gas) into useful mechanical work. It is also considered that power source 12 may embody a furnace or a similar non-engine device. Power source 12 may receive air via a passageway 16 and may output an exhaust flow via a passageway 18.

Air may enter fluid system 10 via an induction valve 15. Induction valve 15 may embody a butterfly valve, a gate valve, a ball valve, a globe valve, or any other type of valve known in the art. Induction valve 15 may be solenoid-actuated, hydraulically-actuated, pneumatically-actuated, or actuated in any other manner. Induction valve 15 may fluidly communicate with passageway 16 to direct air through an intake manifold (not shown) and into power source 12.

Emissions control system 14 may reduce emissions of harmful gasses and particulate matter emitted from power source 12 after a combustion process. Emissions control system 14 may include a diesel oxidation catalyst ("DOC") 22, a catalyzed or non-catalyzed diesel particulate filter 24, an injector 26, a selective catalytic reduction ("SCR") device 28, and a controller 30. It is contemplated that DOC 22, particulate filter 24, and SCR device 28 may be separate devices acting in series or that two or more of DOC 22, particulate filter 24 and SCR device 28 may be combined into a single device (e.g., a CRT™ or a CCR™). It is also contemplated that multiple DOC 22, particulate filter 24, and SCR devices 28 may be used. Emissions control system 14 may include additional filtering or catalyst devices downstream of SCR device 28, such as, for example, an ammonia oxidation catalyst.

DOC 22 may be a flow-through device that converts hydrocarbons, carbon monoxide and/or nitrous oxide into less noxious products. DOC 22 may be a hollow member with a honeycomb-like structure (not shown) through which exhaust may flow. The honeycomb-like structure may have an active catalyst layer comprised of any suitable catalytic material, such as, for example, platinum, aluminum, palladium, rhodium, barium, cerium, alkali metals, alkaline-earth metals, rare-earth metals, or any combinations thereof. As the exhaust flow interacts with the catalyst, the hydrocarbons in the exhaust flow may be oxidized. It is contemplated that DOC 22 may also oxidize NO into $NO_2$, which may be used to oxidize particulate matter in particulate filter 24. It is also contemplated that DOC 22 may be omitted, if desired.

Particulate filter 24 may filter particulate matter or soot from the exhaust flow before the flow is released into the atmosphere via a passageway 38. Particulate filter 24 may contain filtering elements (not shown), arranged into a honeycomb, mesh, and/or other suitable configuration. The filtering elements of particulate filter 24 may be composed of any appropriate filter material known in the art, such as, for example, foam cordierite, sintered metal, paper, ceramic, silicon carbide, or any combination thereof. It is contemplated that particulate filter 24 may be passively or actively regenerated to remove the particulate matter from the filtering elements of particulate filter 24. It is also contemplated that particulate filter 24 may include a catalyst material (i.e., a catalyzed diesel particulate filter). The catalyst material in particulate filter 24 may increase the amount of $NO_2$ in the exhaust flow to improve a passive regeneration capacity and an NOx reduction efficiency.

SCR device 28 may be a flow-through device configured to catalyze a reaction between exhaust NOx and a reduction agent supplied by injector 26. SCR device 28 may include a catalyst, or specifically, a catalyst support material and a metal promoter dispersed within the catalyst support material. The catalyst support material may include at least one of alumina, zeolite, aluminophosphates, hexyluminates, aluminosilicates, zirconates, titanosilicates, and titanates. In one embodiment, the catalyst support material may include at least one of alumina and zeolite, and the metal promoter may include silver metal. Combinations of these materials may be used, and the catalyst material may be chosen based on the type of fuel used, the ethanol additive used, the air to fuel-vapor ratio desired, and/or for conformity with environmental standards.

Injector 26 may inject the reduction agent to dose the surface of SCR device 28. Injector 26 may be located at or upstream of SCR device 28. Injector 26 may fluidly communicate with a reduction agent supply tank (not shown) to provide for repeated injections of the reduction agent. The reduction agent may be, for example, gaseous ammonia, ammonia in aqueous solution, aqueous urea, or ammonia from an ammonia generator (not shown).

Controller 30 may embody a single microprocessor or multiple microprocessors that include a means for controlling the amount of reduction agent injected by injector 26. Numerous commercially available microprocessors may be configured to perform the functions of controller 30. It should be appreciated that controller 30 may readily embody a general machine microprocessor capable of controlling numerous machine functions. In addition, various other circuits may be associated with controller 30, such as power supply circuitry, signal conditioning circuitry, data acquisition circuitry, signal output circuitry, signal amplification circuitry, and other types of circuitry known in the art. Controller 30 may communicate with injector 26 via communication line 42 and power source 12 via communication line 40. It is contemplated that controller 30 may communicate with other machine sensors (not shown), such as NOx sensors, $NH_3$ sensors, temperature sensors, mass flow rate sensors, and/or any other fluid system sensors that may provide information related to the operational characteristics of emissions control system 14.

Figure 2:
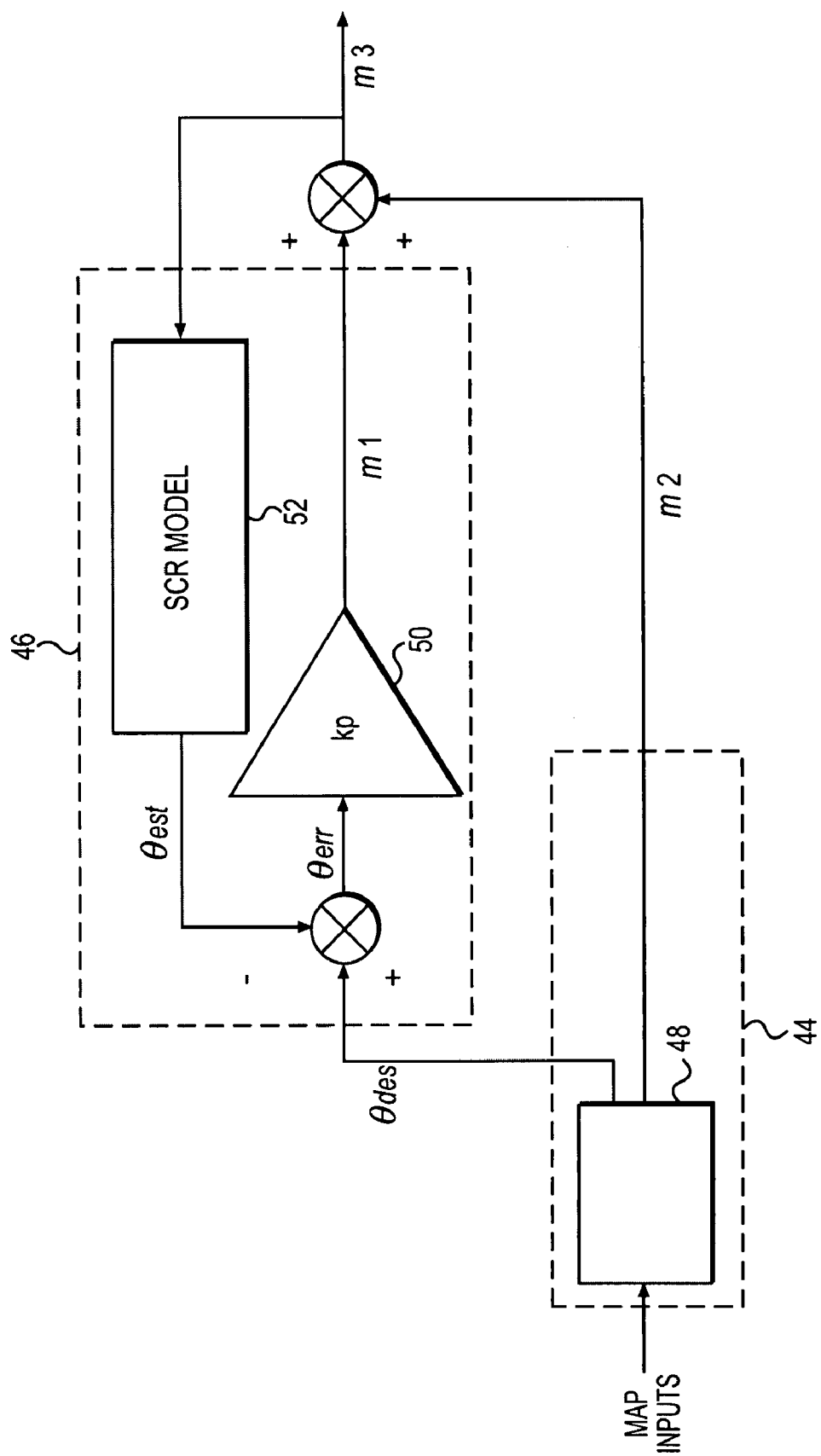
FIG. 2 is a control diagram depicting an exemplary operation of the disclosed control system.

As shown in FIG. 2, controller 30 may include internal logic/programming that allows it to calculate one or more desired outputs, given one or more inputs. For example, controller 30 may include programming defining a first feedforward control structure 44 configured to reduce the NOx under steady state conditions. First feedforward control structure 44 may utilize one or more multi-dimensional maps 48 stored within the memory of controller 30. Maps 48 may have multiple inputs and multiple outputs. The inputs of maps 48 may include, for example, a characteristic catalyst temperature, a space velocity, and a $NO_2$/NOx ratio at an SCR device inlet.

Maps 48 may be generated from steady-state simulations and/or empirical data. The outputs of maps 48 may include a second injection amount m2, and a desired catalyst surface coverage θdes. The second injection amount m2 may be the amount of reduction agent required to reduce NOx in the exhaust and minimize slip under steady state conditions. The catalyst surface coverage θ may be the fraction of active sites on the surface of the SCR device catalyst that are covered by $NH_3$ molecules. It is contemplated that each injection amount may be a function of time (i.e., an injection rate).

Controller 30 may also include programming defining a second feedforward control structure 46 to account for dynamic changes in fluid system 10. Dynamic changes may include, for example, a sudden change in an exhaust flow, an exhaust temperature, or a NOx concentration. Second feedforward control structure 46 may be, for example, a virtual state feedback controller with a proportional gain 50. Second feedforward control structure 46 may include an SCR model 52, which is a dynamic model of the SCR process. It is contemplated that second feedforward control structure 46 may have one or more inputs and one or more outputs. One of the inputs to second feedforward control structure 46 may be a desired catalyst surface coverage, θdes, which may be obtained from first feedforward control structure 44. One of the outputs of second feedforward control structure 46 may be a first injection amount m1. It is contemplated that the first injection amount m1 may be combined with the second injection amount m2 to create a third injection amount m3, which may be applied by injector 26.

SCR model 52, as used by controller 30, may include an approximation that decouples and allows the solution of a plurality of differential equations that describe the SCR process (including Reactions (1)-(5)). The plurality of differential equations may include rate equations, thermal and mass transport equations, and other equations well known in the art. For example, the equations may take the form:

$$\Omega \frac{d\theta}{dt} = R_{ads} - R_{des} - R_{NO} - R_{NO+NO_2} - R_{NO_2} - R_{ox} \quad (7)$$

$$0 = -u\frac{dC_{NH_3}}{dz} + V_{wc/void}(R_{des} - R_{ads}) \quad (8)$$

$$0 = -u\frac{dC_{NO}}{dz} - V_{wc/void}(R_{NO} + 0.5R_{NO+NO_2}) \quad (9)$$

$$0 = -u\frac{dC_{NO_2}}{dz} - V_{wc/void}(0.75R_{NO_2} + 0.5R_{NO+NO_2}) \quad (10)$$

$$(1-\varphi_1)\rho_s c_{p,s}\frac{\partial T}{\partial t} = -\varphi_1 \rho_g c_{p,g} u \frac{\partial T}{\partial z} \quad (12)$$

where C is a species concentration, c is a specific heat, $\Omega$ is the $NH_3$ storage capacity of the catalyst, R represents a reaction rate source term, $V_{wc/void}$ is a geometric constant, u is the exhaust flow velocity, T is a temperature, z is a spatial coordinate, p is a density, t is time, and φ is a void fraction. The subscripts "g" and "s" represent solid and gas, respectively. It is contemplated that the plurality of differential equations may include additional and/or different equations or terms.

The decoupled solution of the plurality of differential equations may be used by controller 30 in real time calculations of θ. In order to obtain the decoupled solution, controller 30 may approximate that an equal molar amount of NO and $NO_2$ goes through Reaction (3) until the reaction is complete. Once Reaction (3) is complete, the NO or $NO_2$ that was not included in the equal molar amount may go through either Reaction (2) or Reaction (4), depending on whether there is initially (i.e., prior to Reaction (3)) a larger molar amount of NO or $NO_2$. For example, when the initial molar amount of NO exceeds the initial amount of $NO_2$, the approximation may dictate that an equal molar amount of NO and $NO_2$ follow Reaction (3). Subsequently, there may be a remaining quantity of NO that was not involved in Reaction (3). According to the approximation, this remaining quantity of NO may thereafter follow Reaction (2). Alternatively, when the initial molar amount of $NO_2$ is greater than the initial amount of NO, the approximation may dictate that after Reaction (3), the remaining $NO_2$ follows Reaction (4).

In other words, the approximation may assume that Reactions (2)-(4) occur in series (e.g., Reaction (3) occurs first, followed by Reaction (2) or Reaction (4)) rather than in parallel (e.g., Reactions (2)-(4) occur simultaneously). This approximation may accurately describe the reaction process because Reaction (3) may be kinetically faster than Reactions (2) and (4).

SCR model 52 may be solved over a plurality of control volumes or computational cells mapped along the length of the SCR device catalyst. The solution may be given by:

$$\Omega \frac{\theta^n - \theta^{n-1}}{\Delta t} = \frac{u}{LV_{wc/void}} \begin{bmatrix} C_{NH3,in} - C_{NH3,out} + \\ a(C_{NO,out} - C_{NO,in}) + \\ b(C_{NO2,out} - C_{NO2,in}) \end{bmatrix} - R_{ox}(\bar{T}, \theta^{n-1}) \quad (13)$$

where a and b are constants whose magnitude may depend on whether the initial value of $C_{NO2,in}$ is greater than $C_{NO,in}$ or vice versa, L is the length of the control volume/computational cell, $\bar{T}$ is an average temperature over the length of the control volume/computational cell, the subscripts "in" and "out" denote inlet and outlet values at each control volume/computational cell, respectively, and the superscripts "n–1" and "n" denote values at the last and current time steps, respectively. The first control volume/computational cell may correspond to the inlet of SCR device 28, and the last control volume/computational cell may correspond to the outlet of SCR device 28 (the remaining control volume/computational cells being located between the first and last). The θ of each cell may be calculated in real time and used to calculate an average value of all of the cells, θest.

Industrial Applicability

The disclosed control system may be applicable to any fluid system where control of an SCR process is desired. Specifically, the disclosed control system may be used to limit the amount of pollutants in the exhaust flow emitted from a combustion engine. The disclosed control system may have a controller with an internal model that calculates, in real-time, an amount of injected reduction agent required to react with NOx in the exhaust flow and prevent slip.

Referring to FIG. 1, atmospheric air may be drawn into fluid system 10 via induction valve 15 and communicated via passageway 16 to power source 12. Fuel may be mixed with the air before entering combustion chambers 20, and the fuel-air mixture may be combusted by power source 12 to produce mechanical work and an exhaust flow. The exhaust flow may contain a complex mixture of air pollutants and particulate matter.

The exhaust flow may be communicated via passageway 18 to DOC 22. The exhaust flow may pass through the active catalyst layer of DOC 22, thus causing hydrocarbons in the exhaust flow to be oxidized. The exhaust flow may then be communicated to particulate filter 24, wherein it may pass through the one or more filtering elements to remove particulate matter from the exhaust flow. It is contemplated that the particulate matter, when deposited on the filtering elements of particulate filter 24, may be passively and/or actively regenerated.

The exhaust flow exiting particulate filter 24 may be communicated to SCR device 28, wherein the NOx in the exhaust flow may be reduced. For example, controller 30 may be configured to command injector 26 to inject reduction agent into the exhaust flow (at or upstream of SCR device 28). Controller 30 may include programming that allows it to selectively actuate injector 26.

Referring to FIG. 2, during operation of controller 30, first feedforward control structure 44 may receive one or more inputs. The first feedforward control structure inputs may be referenced to maps 48 to obtain θdes and m2. θdes may then be fed into second feedforward control structure 46 where it may be compared to θest to obtain a surface coverage error, θerr. θerr may be multiplied by proportional gain 50, to obtain m1. m1 may then be summed with m2 to obtain m3, the third injection amount of reduction agent. It is contemplated that the value of m1 may be positive or negative, thus increasing or decreasing the value of m3, respectively. The value of m3 may be communicated via communication line 42 (referring to FIG. 1) to injector 26, where it may be applied by injector 26. The value of m3 may also be fed back into SCR model 52 to allow for calculation of a new value of θest, and ultimately a new value of m3.

When the reduction agent is a compound such as urea, it may undergo a hydrolysis process upon injection into the exhaust flow. During the hydrolysis process, the urea may decompose into byproducts, including, for example, gaseous $NH_3$ and carbon dioxide. The $NH_3$ from the urea may then be stored on the surface of the catalyst to react with and reduce the NOx. It is also contemplated that the reduction agent may be ammonia that may be directly absorbed by the catalyst.

Several advantages of the disclosed control system may be realized. In particular, the model of the disclosed controller may account for both NO and $NO_2$ in a real time calculation, thus allowing for use of the control system in fluid systems that include a DOC or a catalyzed soot filter (i.e., catalyzed diesel particulate filter). Also, because all of the DeNOx reactions are used in the model of the disclosed controller, the disclosed control system may also be applied to a wide variety of engines with only minor calibration.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. An emissions control system, comprising:
    an SCR device that receives a flow of exhaust and is configured to reduce NOx in the exhaust by a plurality of SCR reactions including a reaction of $NH_3$, NO, and $NO_2$ to produce $N_2$ and $H_2O$, a reaction of $NH_3$, NO, and $O_2$ to produce $N_2$ and $H_2O$, and a reaction of $NH_3$ and $NO_2$ to produce $N_2$ and $H_2O$;
    an injector that introduces a reduction agent into the flow of exhaust at or upstream of a catalyst within the SCR device; and
    a controller in communication with the injector, the controller configured to:
    calculate a first amount of the reduction agent by using an approximation that the reaction of $NH_3$, NO, and $NO_2$ to produce $N_2$ and $H_2O$ must be completed before the reaction of $NH_3$, NO, and $O_2$ to produce $N_2$ and $H_2O$ or the reaction of $NH_3$ and $NO_2$ to produce $N_2$ and $H_2O$ commences; and
    adjust the injector according to at least the first amount.

2. The emissions control system of claim 1, wherein:
    the reduction agent includes a reductant; and
    the first amount is calculated in order to reduce NOx in the exhaust while minimizing reductant slip.

3. The emissions control system of claim 1, wherein the approximation is applied to an SCR model to create a decoupled solution that describes the plurality of SCR reactions.

4. The emissions control system of claim 3, wherein the solution is a function of at least one of a NO concentration, a $NO_2$ concentration, a $NH_3$ concentration, a geometric constant, or an exhaust flow velocity.

5. The emissions control system of claim 3, wherein the solution is solved over a plurality of computational cells.

6. The emissions control system of claim 5, wherein the solution is a function of a length of each computational cell.

7. The emissions control system of claim 3, wherein:
    the reduction agent includes a reductant; and
    an output of the solution is a calculated surface coverage of reductant on the catalyst.

8. The emissions control system of claim 1, wherein the controller further includes a plurality of maps.

9. The emissions control system of claim 8, wherein:
    the controller uses the plurality of maps to determine a second amount of the reduction agent;
    the first amount is added to the second amount to obtain a third amount of the reduction agent; and
    the third amount is applied by the injector to the flow of exhaust.

10. The emissions control system of claim 1, further including at least one of a diesel oxidation catalyst or a catalyzed particulate filter upstream of the SCR catalyst.

11. A method of controlling an SCR process, comprising:
    creating a flow of exhaust;
    communicating the flow of exhaust to a catalyst and is configured to reduce NOx in the exhaust by a plurality of SCR reactions including a reaction of $NH_3$, NO, and $NO_2$ to produce $N_2$ and $H_2O$, a reaction of $NH_3$, NO, and $O_2$ to produce $N_2$ and $H_2O$, and a reaction of $NH_3$ and $NO_2$ to produce $N_2$ and $H_2O$;
    calculating a first amount of a reduction agent for injection into the flow of exhaust, wherein calculating a first amount is achieved by approximating that the reaction of $NH_3$, NO, and $NO_2$ to produce $N_2$ and $H_2O$ must be completed before the reaction of $NH_3$, NO, and $O_2$ to produce $N_2$ and $H_2O$ and the reaction of $NH_3$ and $NO_2$ to produce $N_2$ and $H_2O$; and
    adjusting an amount of the reduction agent currently being injected into the flow of exhaust at or upstream of the catalyst according to at least the first amount of the reduction agent.

12. The method of claim 11 wherein calculating includes calculating a first amount that reduces NOx while minimizing $NH_3$ slip.

13. The method of claim 12, wherein approximating is applied to create a decoupled solution that describes the plurality of SCR reactions.

14. The method of claim 13, wherein:
    the reduction agent includes a reductant; and
    an output of the solution is a calculated surface coverage of reductant on the catalyst.

15. The method of claim 12, wherein calculating further includes:
- calculating a second amount of the reduction agent using a plurality of maps; and
- adding the first amount to the second amount to obtain a third amount of the reduction agent, wherein the third amount of the reduction agent is injected into the flow of exhaust at or upstream of the catalyst.

16. A fluid system, comprising:
- a power source;
- an intake passageway for communicating air into the power source;
- an exhaust passageway for conveying a flow of exhaust away from the power source;
- an SCR device that receives the flow of exhaust from the exhaust passageway and is configured to reduce NOx in the exhaust by a plurality of SCR reactions including a reaction of $NH_3$, $NO$, and $NO_2$ to produce $N_2$ and $H_2O$, a reaction of $NH_3$, $NO$, and $O_2$ to produce $N_2$ and $H_2O$, and a reaction of $NH_3$ and $NO_2$ to produce $N_2$ and $H_2O$;
- an injector that introduces a reduction agent into the flow of exhaust at or upstream of a catalyst within the SCR device; and
- a controller in communication with the injector, the controller configured to:
- determine a first amount of the reduction agent by using an approximation that the reaction of $NH_3$, $NO$, and $NO_2$ to produce $N_2$ and $H_2O$ must be completed before the reaction of $NH_3$, $NO$, and $O_2$ to produce $N_2$ and $H_2O$ or the reaction of $NH_3$ and $NO_2$ to produce $N_2$ and $H_2O$ commences; and
- adjust the injector according to at least the first amount.

* * * * *